United States Patent
Kakishima et al.

(10) Patent No.: US 10,321,441 B2
(45) Date of Patent: Jun. 11, 2019

(54) USER TERMINAL AND RADIO COMMUNICATION METHOD

(71) Applicant: NTT DOCOMO, INC., Tokyo (JP)

(72) Inventors: Yuichi Kakishima, Tokyo (JP); Kazuaki Takeda, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/439,239

(22) Filed: Feb. 22, 2017

(65) Prior Publication Data

US 2017/0164356 A1    Jun. 8, 2017

Related U.S. Application Data

(63) Continuation of application No. 14/431,529, filed as application No. PCT/JP2013/072008 on Aug. 16, 2013, now abandoned.

(30) Foreign Application Priority Data

Sep. 28, 2012  (JP) ................................. 2012-218198

(51) Int. Cl.
*H04W 72/04* (2009.01)
*H04W 52/40* (2009.01)
(Continued)

(52) U.S. Cl.
CPC ..... *H04W 72/0413* (2013.01); *H04L 27/2601* (2013.01); *H04W 52/146* (2013.01);
(Continued)

(58) Field of Classification Search
CPC ... H04W 52/32; H04W 52/346; H04W 52/40; H04W 52/146; H04W 52/16;
(Continued)

(56) References Cited

U.S. PATENT DOCUMENTS 8,948,119 B2 *  2/2015  Ahn ..................... H04W 52/146
                                                    370/329
8,964,683 B2    2/2015  Dinan
                        (Continued)

FOREIGN PATENT DOCUMENTS

CN      102308640 A      1/2012
WO      2012/060067 A1   5/2012

OTHER PUBLICATIONS

3GPP TR 25.912 V7.1.0, "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)," Sep. 2006 (57 pages).

(Continued)

*Primary Examiner* — Asad M Nawaz
*Assistant Examiner* — Thomas R Cairns
(74) *Attorney, Agent, or Firm* — Osha Liang LLP

(57) ABSTRACT

A user terminal includes a transmission section that transmits channels using a first cell and a second cell that belong to different cell groups, and a control section that, when a channel to be transmitted in the first cell and a channel to be transmitted in the second cell are same channels and channel transmission in the first cell overlaps at least partially in time with channel transmission in the second cell, preferentially allocates transmission power to one of the channel transmission in the first cell and the channel transmission in the second cell over the other.

6 Claims, 9 Drawing Sheets

CASE 1

(51) Int. Cl.
*H04W 56/00* (2009.01)
*H04L 27/26* (2006.01)
*H04W 52/32* (2009.01)
*H04W 52/34* (2009.01)
*H04W 52/14* (2009.01)
*H04W 88/02* (2009.01)
*H04W 88/08* (2009.01)
*H04W 52/16* (2009.01)

(52) U.S. Cl.
CPC ......... *H04W 52/32* (2013.01); *H04W 52/325* (2013.01); *H04W 52/346* (2013.01); *H04W 52/40* (2013.01); *H04W 56/00* (2013.01); *H04W 72/0453* (2013.01); *H04W 52/16* (2013.01); *H04W 52/343* (2013.01); *H04W 88/02* (2013.01); *H04W 88/08* (2013.01)

(58) Field of Classification Search
CPC ............... H04W 52/343; H04W 56/00; H04W 72/0413; H04W 72/0453; H04W 88/02; H04W 88/08; H04L 27/2601
See application file for complete search history.

(56) References Cited

U.S. PATENT DOCUMENTS

| | | | |
|---|---|---|---|
| 8,982,801 | B2 | 3/2015 | Shin et al. |
| 9,008,050 | B2* | 4/2015 | Feuersanger ....... H04W 52/281 370/336 |
| 9,020,556 | B2 | 4/2015 | Haim et al. |
| 9,456,429 | B2* | 9/2016 | Ouchi .................. H04W 72/12 |
| 9,585,101 | B2* | 2/2017 | Stern-Berkowitz .......................... H04W 52/146 |
| 9,763,151 | B2* | 9/2017 | Kim ......................... H04L 5/00 |
| 2011/0038271 | A1 | 2/2011 | Shin et al. |
| 2011/0237288 | A1 | 9/2011 | Ratasuk et al. |
| 2011/0243087 | A1 | 10/2011 | Ahn et al. |
| 2013/0028223 | A1 | 1/2013 | Kim et al. |
| 2013/0215811 | A1 | 8/2013 | Takaoka et al. |
| 2015/0031410 | A1 | 1/2015 | Lim et al. |
| 2017/0164408 | A1* | 6/2017 | Takeda .............. H04W 74/0833 |
| 2017/0303212 | A1* | 10/2017 | Takeda ................ H04W 52/325 |

OTHER PUBLICATIONS

3GPP TS 36.211 V8.1.0, "3rd Generation Partnership Project; Technical Specification Group Radio Access Network; Evolved Universal Terrestrial Radio Access (E-UTRA); Physical Channels and Modulation (Release 8)," Nov. 2007 (54 pages).
International Search Report issued in PCT/JP2013/072008, dated Oct. 29, 2013 (2 pages).
Extended European Search Report issued in corresponding European Application No. 13840331.6 dated Mar. 24, 2016 (11 pages).
Office Action issued in the counterpart European Patent Application No. 13840331.6, dated Feb. 7, 2017 (6 pages).
Office Action issued in the counterpart European Patent Application No. 13840331.6, dated Jun. 26, 2017 (5 pages).
Office Action issued in corresponding European Patent Application No. 13840331.6, dated Oct. 31, 2017 (5 pages).
3GPP TS 36.300 V.11.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Sep. 2012 (205 pages).
Office Action issued in the counterpart Chinese Patent Application No. 201380050668.0, dated Dec. 27, 2017 (25 pages).
Office Action issued in corresponding Japanese Application No. 2016-247579, dated Jan. 16, 2018 (6 pages).
Panasonic; "UE behavior for power limitation in multiple TA"; 3GPP TSG-RAN WG1 Meeting #69, R1-122177; Prague, Czech Republic; May 21-25, 2012 (4 pages).
Catt; "UL transmission method with multiple timing advances in Rel-11"; 3GPP TSG RAN WG1 Meeting #70, R1-123211; Qingdao, China; Aug. 13-17, 2012 (4 pages).
Office Action issued in corresponding Chinese Application No. 201380050668.0, dated Sep. 5, 2018 (8 pages).

* cited by examiner

USER TERMINAL AND RADIO COMMUNICATION METHOD

CROSS-REFERENCE TO RELATED APPLICATIONS

The present application is a continuation application of and, thereby, claims benefit under 35 U.S.C. § 120 to U.S. patent application Ser. No. 14/431,529 filed on Mar. 26, 2015, titled, "RADIO COMMUNICATION SYSTEM, BASE STATION APPARATUS, USER TERMINAL AND RADIO COMMUNICATION METHOD," which is a national stage application of PCT Application No. PCT/JP2013/072008, filed on Aug. 16, 2013, which claims priority to Japanese Patent Application No. 2012-218198 filed on Sep. 28, 2012. The contents of the priority applications are incorporated by reference in their entirety.

TECHNICAL FIELD

The present invention relates to a user terminal and a radio communication method to carry out multi-carrier transmission with a plurality of connecting cells at different times on the uplink.

BACKGROUND ART

LTE (Long Term Evolution) has been under study heretofore, for the purposes of achieving improved spectral efficiency and peak data rates, reducing delays and so on in UMTS (Universal Mobile Telecommunications System) (non-patent literature 1). As a result of this, in Release-8 LTE (hereinafter referred to as "Rel. 8-LTE"), as radio access schemes, a scheme that is based on orthogonal frequency division multiplexing access (OFDMA) was employed for the downlink, and a scheme that is based on single-carrier frequency division multiple access (SC-FDMA) was employed for the uplink. In Rel.8-LTE, it is possible to achieve transmission rates of approximately maximum 300 Mbps on the downlink and 75 Mbps on the uplink, by using a variable band that ranges from 1.4 MHz to 20 MHz. Presently, in 3GPP, successor systems of LTE (referred to as "LTE advanced" ("LTE-A")) are under study for the purpose of achieving further broadbandization and faster speed beyond the UMTS network.

Recently, a study is progress to achieve increased network capacity by building a heterogeneous network (HetNet), in which low-power nodes (LPN) of low transmission power are overlaid in the area of a macro cell, and applying carrier aggregation (CA) to the HetNet. Carrier aggregation refers to the technique of achieving broadbandization by using a frequency band (1.4 MHz to 20 MHz) that is supported in LTE as one component carrier (CC) and using multiple CCs at the same time. In the HetNet, it is possible to realize efficient user terminal control, traffic off-loading and so on, by changing the connecting cell to which a user terminal is connected, on a per CC basis.

FIG. 1 shows, as an example, a state in which a user terminal UE is connected with two cells of a base station apparatus eNB (macro cell) and a low power node LPN (low power cell) in a HetNet. The user terminal UE is allocated component carriers CC #1 and CC #2 by carrier aggregation, and connects with the macro cell via component carrier CC #1 and connects with the low power cell via component carrier CC #2. Since the low power node LPN 2 has a small cell, the user terminal UE is located in a position closer to the low power node LPN than to the base station apparatus eNB. In Rel. 11-LTE, which is the latest standard of LTE-A, an MTA (Multiple Timing Advance) function to make it possible to define a plurality of transmission times for a plurality of CCs on the uplink is introduced (up to Rel. 10, a user terminal is subject to single-transmission time control (which is referred to as "TA" or "single TA")), for the purpose of coordinating the times of reception between separate nodes (base station apparatus, low power node and so on). In the example shown in FIG. 1, the macro cell carries out uplink transmission at a transmission time T1, and the low power cell carries out uplink transmission at a transmission time T2, which is a predetermined time delayed from transmission time T1.

In LTE-A, carrier aggregation to use maximum five CCs is realized. In MTA, which is introduced in Rel. 11-LTE, maximum five CC are classified into maximum four TA groups (TAGs), and the times of transmission are controlled on a per TAG basis.

As an example, FIG. 2 shows a state in which five CCs are classified into four TAGs. Five of CC #1 to CC #5 are classified into four of TAG #1 to TAG #4. TAG #1 is assigned to CC #1, one TAG #2 is assigned to two of CC #2 and CC #3, TAG #3 is assigned to CC #4, and TAG #4 is assigned to CC #5.

When the times of uplink transmission are controlled on a per TAG basis in a user terminal UE where MTA is applied, as shown in FIG. 3, the difference between the transmission times of the TAGs may develop to approximately 30 μs at a maximum. FIG. 3 shows a state in which the transmission times of TAG #1 and TAG #2 are, for example, 30 μs different.

CITATION LIST

Non-Patent Literature

Non-Patent Literature 1: 3GPP, TR25.912 (V7.1.0), "Feasibility Study for Evolved UTRA and UTRAN," September 2006

Non-Patent Literature 2: 3GPP, TS36.211 Sec. 8.1, "Timing Advance"

SUMMARY OF THE INVENTION

Technical Problem

In the uplink in the LTE-A system, transmission power is controlled in CC units and in subframe units, and is controlled so that the total transmission power in each subframe does not exceed an upper limit.

When the MTA function introduced in Rel. 11-LTE is applied to a user terminal, there is a concern that parts (PO: Partial Overlap) where subframes overlap between TAGs may be produced, and there is also a possibility that the upper limit of transmission power is exceeded in the PO periods. For example, even if, as shown in FIG. 4, transmission power is controlled in subframe units, on a per TAG basis, such that, when one TAG enters a high power subframe period, the other TAG enters a low power subframe period, if a PO period in which high power subframes overlap between the TAGs is produced, the upper limit of transmission power is exceeded in the PO period. So, when there is a possibility that the total transmission power in a PO period exceeds the upper limit, it is necessary to apply power scaling to the PO period or to the entire subframe period, and reduce the total transmission power. When "power scaling" is mentioned herein, this refers not only to reducing power, but also covers cases where power is made zero.

However, when power scaling is applied to a PO period, signal power decreases, and therefore a problem arises that uplink transmission quality is deteriorated.

The present invention has been made in view of the above, and it is therefore an object of the present invention to provide a radio communication system, a user terminal, a base station apparatus and a radio communication method whereby it is possible to apply power scaling to PO periods while maintaining uplink transmission quality.

Solution to Problem

The radio communication system according to the present invention is a radio communication system, in which multiple cells are formed, and which has a plurality of base station apparatuses that each form a cell included in the multiple cells, and a user terminal that can connect to at least a first cell and a second cell included in the multiple cells, and, in this radio communication system, the base station apparatuses has a control section that controls uplink transmission times per timing group including one component carrier or a plurality of component carriers, and a transmission section that signals a timing group or a component carrier determined as a target of power scaling, as power scaling target information, in which the timing group or the component carrier, to which power scaling is applied, is expressly determined, to the user terminal, and the user terminal has a receiving section that receives the power scaling target information signaled from the base station apparatus, a transmission section that transmits uplink signals at different transmission times per timing group, and a power control section that, when a total of uplink signal transmission power over the first cell and the second cell exceeds a predetermined value, applies power scaling to the timing group or the component carrier determined in the power scaling target information.

The base station apparatus according to the present invention is a base station apparatus that forms a cell in a radio communication system where multiple cells are formed, and this base station apparatus has a control section that controls uplink transmission times per timing group including one component carrier or a plurality of component carriers, and a transmission section that signals a timing group or a component carrier determined as a target of power scaling, as power scaling target information, in which the timing group or the component carrier, to which power scaling is applied, is expressly determined, to the a user terminal, and the user terminal is connected to multiple cells and controlled to different transmission times per timing group.

The user terminal according to the present invention is a user terminal that connects to multiple cells in a radio communication system where a plurality of base station apparatuses form multiple cells, and this user terminal has a receiving section that receives power scaling target information signaled from a base station apparatus, a transmission section that transmits uplink signals at different transmission times per timing group, and a power control section that, when a total of uplink signal transmission power over connecting cells exceeds a predetermined value, applies power scaling to the timing group or the component carrier determined in the power scaling target information.

The radio communication method according to the present invention is a radio communication method in a radio communication system where multiple cells are formed, and the radio communication system has a plurality of base station apparatuses that each form a cell included in the multiple cells, and a user terminal that can connect to at least a first cell and a second cell included in the multiple cells, and the radio communication method includes the steps of controlling uplink transmission times per timing group including one component carrier or a plurality of component carriers, signaling a timing group or a component carrier determined as a target of power scaling, as power scaling target information, in which the timing group or the component carrier, to which power scaling is applied, is expressly determined, to the user terminal, in the user terminal, receiving the power scaling target information signaled from the base station apparatus, transmitting uplink signals at different transmission times per timing group, and, when a total of uplink signal transmission power over multiple cells, to which the user terminal is connected at the same time, exceeds a predetermined value, applying power scaling to the timing group or the component carrier determined in the power scaling target information.

Technical Advantage of the Invention

According to the present invention, it is possible to apply power scaling to periods in which uplink transmission power exceeds an upper limit value, while maintaining uplink transmission quality.

DESCRIPTION OF EMBODIMENTS

A gist of the present invention is that a base station apparatus eNB expressly determines a TAG (or a cell, a CC, an uplink physical channel, etc.), to which a user terminal UE should apply power scaling preferentially, and signals power scaling target information for specifying the TAG and/or the like, to which power scaling is to be applied preferentially, to the user terminal UE. By this means, it is possible to determine the TAG and/or the like, to which the user terminal UE should apply power scaling, in the base station apparatus eNB, so that it is possible to improve the flexibility in network management. The base station apparatus eNB can flexibly determine the TAG (or cell, CC, uplink physical channel, etc.) to apply power scaling to, such that the deterioration of uplink transmission quality is reduced, by taking into account the communication environment (cell configurations, the conditions of carrier aggregation, transmission quality, traffic, transmission power, transport block size, and so on).

Now, the details will be described with reference to the network configuration shown in FIG. 1. A user terminal UE is connected with a macro cell (base station apparatus eNB), which serves as a first cell, and is also connected with a low power cell (low power node LPN), which serves as a second cell. It is not an essential requirement of the present invention that the first cell should be a macro cell and the second cell should be a low power cell. The present invention by no means limits the number of cells to which a user terminal can be connected at the same time to two cells. The base station apparatus eNB and the low power node LPN are connected via a backhaul link, and the base station apparatus eNB controls the low power node LPN. The low power node LPN receives information (for example, TAG information) that is required for communication with user terminals UE from the base station apparatus eNB via the backhaul link.

The base station apparatus eNB allocates a plurality of component carriers CC #1 and CC #2 to the user terminal UE by carrier aggregation, and also commands the cell configurations to the user terminal UE so that one component carrier CC #1 is allocated to the macro cell and the other component carrier CC #2 is allocated to the low power cell. When the cells are configured such that the user terminal UE is assigned a plurality of component carriers and is connected with a plurality of cells at the same time, the base station apparatus eNB classifies the plurality of component carriers assigned to the user terminal UE into TAGs, and controls the times of transmission on a per TAG basis. In the example shown in FIG. 1, CC #1 that is allocated to the macro cell is classified as TAG #1, and CC #2 that is allocated to the low power cell is classified as TAG #2.

Figure 4:
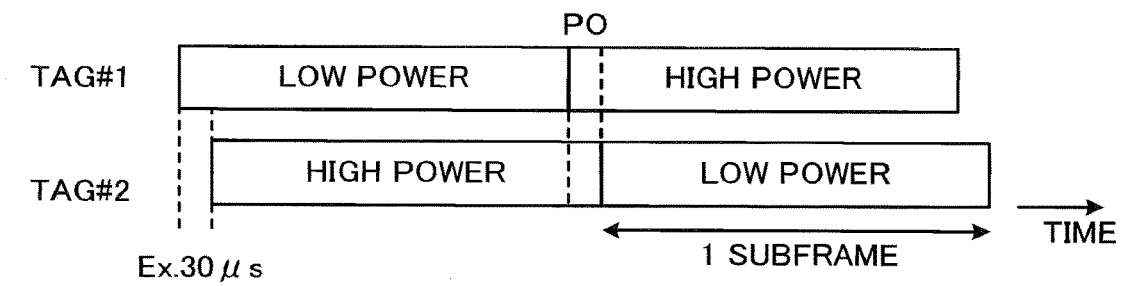
FIG. 4 is a diagram to show a PO period in which high power subframes overlap between TAGs.

The user terminal UE can transmit an uplink physical control channel and an uplink physical data channel via a plurality of component carriers CC #1 and CC #2. To be more specific, the user terminal UE controls the time to transmit uplink subframes to transmission time T1 in communication with the macro cell (TAG #1 and CC #1), and controls the time to transmit uplink subframes to transmission time T2 in communication with the low power cell (TAG #2 and CC #2). At this time, TAG #1 and TAG #2 offer different times for uplink transmission (T1 and T2), and therefore a PO period is produced (see FIG. 4).

The base station apparatus eNB expressly determines the TAG to which power scaling is applied in the user terminal UE. For example, in order to determine the TAG to apply power scaling to, it may be possible to use transmission quality as a basis for decision making. For example, although the deterioration of the transmission quality of TAG #1 (CC #1) might cause severe difficulties in radio communication, a communication environment may be designed, in which the transmission quality of TAG #2 (CC #2), even when deteriorated, can be recovered. In this case, the base station apparatus eNB can determine TAG #2 (CC #2) as the TAG to which power scaling is applied. Alternatively, it is also possible to use traffic as a basis for decision making in order to determine the TAG to apply power scaling to. For example, assume a case where the traffic in TAG #1 (CC #1) is very low and the traffic in TAG #2 (CC #2) is kept to a high value. In this case, the base station apparatus eNB can determine TAG #1 (CC #1) as the TAG to which power scaling is applied. By using transmission quality and traffic as basis for decision making, it is possible to apply power scaling to a PO period so that the deterioration of uplink transmission quality can be reduced.

The base station apparatus eNB can also use the cell configurations as a basis for decision making and expressly determine the TAG where power scaling is applied in the user terminal UE. Carrier aggregation refers to the kind of communication by multiple cells using a plurality of component carriers. It is also possible to define multiple cells (component carriers) as two different types of cells by defining one cell as a primary cell (Pcell) and the other cell as a secondary cell (Scell). The base station apparatus eNB independently configures the primary cell and the secondary cell for the user terminal UE that adopts where carrier aggregation. The primary cell is always formed with a set (combination) of one downlink component carrier and one uplink component carrier. The secondary cell is formed with at least one downlink component carrier, and there are cases where an uplink component carrier is incorporated or not incorporated. Here, the secondary cell is also formed with an uplink component carrier.

Figure 1:
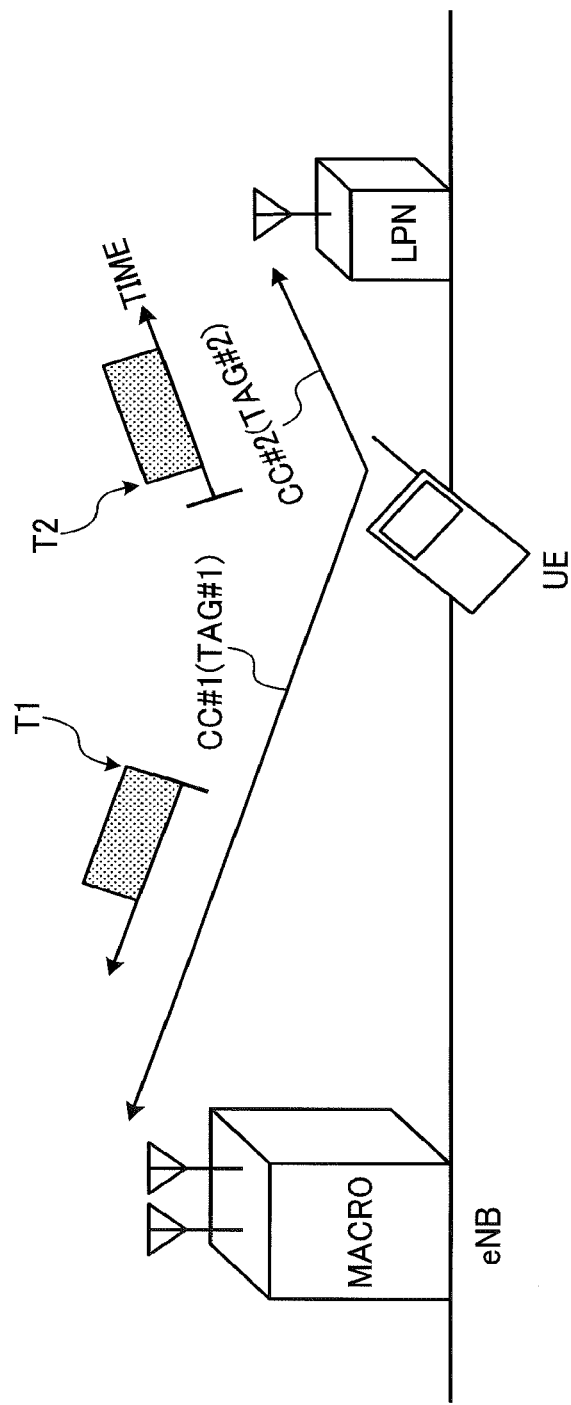
FIG. 1 is a diagram to explain a HetNet.
Figure 2:
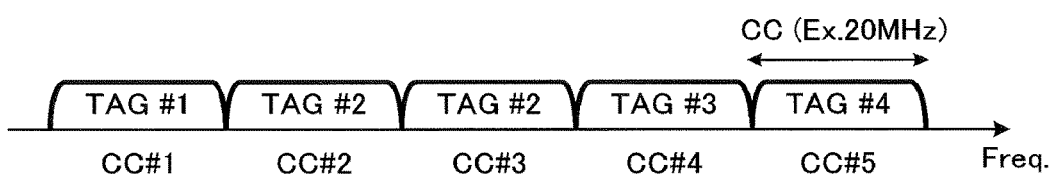
FIG. 2 is a diagram to show the relationship between component carriers and TAGs.
Figure 3:
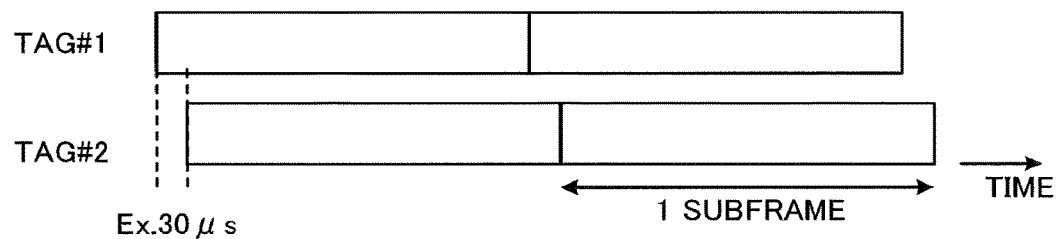
FIG. 3 is a diagram to show a state in which the time of transmission is different between TAGs.

A case will be assumed here where, in the HetNet shown in FIG. 1, the primary cell (TAG #1 and CC #1) is managed for control signals and the secondary cell (TAG #2 and CC #2) is managed for data transmission. In Rel. 10-LTE, the following uplink physical channel configurations are defined in component carrier units. As uplink physical channels, a physical random access channel (PRACH), a physical uplink control channel (PUCCH), a physical uplink shared channel (PUSCH), and a channel quality measurement reference signal (SRS: Sounding Reference Signal) are defined. The PRACH is used when the user terminal makes initial access to the network. From the downlink component carrier that is detected in cell search, the user terminal receives, as broadcast information that is necessary, the parameters of the PRACH (the frequency position, the subframe position, the Zadoff-Chu sequence index and so on), information about the uplink component carrier (the center frequency, the bandwidth and so on), and so on, and transmits the PRACH using the uplink component carrier that correspond to the downlink. The PUCCH is multiplexed at both ends of the band (intra-subframe frequency hopping is applied), and carries ACKs/NACKs, which are response signals (responses) to downlink transmission signals, CQI (Channel Quality Indicator) reports, scheduling requests and so on. CQI refers to quality information that shows the quality of data as received, or the quality of communication channels. The PUSCH is mapped a UL-SCH (an uplink shared channel, which is one transport channel).

The base station apparatus eNB expressly determines the cell (the primary cell or the secondary cell) to apply power scaling to, as an example of using cell configurations as a basis for decision making. For example, when the first cell is managed for control signals and the second cell is operated for data transmission and the component carriers included in the first cell are classified as the first timing group, and the component carriers included in the second cell are classified as the second timing group, the base station apparatus eNB expressly determines the physical uplink control channel (PUCCH) of the first timing group, the physical uplink shared channel (PUSCH) of the second timing group, and the reference signal (SRS) for channel quality measurement, as physical channels to apply power scaling to.

If the primary cell for control signals (TAG #1 and CC #1) becomes the target of power scaling, the transmission power for the control signal (PUCCH) in the primary cell (TAG #1 and CC #1) decreases. If the secondary cell for data transmission (TAG #2 and CC #2) becomes the target of power scaling, the transmission power of the data signal (PUSCH) in the secondary cell decreases. Since the cell to which power scaling is applied (the primary cell or the secondary cell) is reported to the user terminal UE, it is possible to apply power scaling to the control signal (PUCCH) or the data signal (PUSCH) by signaling in cell units in the HetNet environment.

The base station apparatus eNB may expressly determine the cell to apply power scaling to, by linking physical channels with the cells, as an example of using cell configurations as a basis for decision making. To be more specific, if the primary cell for control signals (TAG #1 and CC #1) becomes the target of power scaling, the data signal (PUSCH) in the primary cell may be determined to be subject to power scaling, and, similarly, if the secondary cell for data transmission (TAG #2 and CC #2) becomes the target of power scaling, the control signal (PUCCH) in the secondary cell is may be determined to be subject to power scaling. By this means, power scaling in physical channel units is made possible by reporting the cell to apply power scaling to (the primary cell or the secondary cell), to the user terminal UE.

The base station apparatus eNB expressly determines the physical channels to apply power scaling to, in physical channel units. For example, in the primary cell (TAG #1 and CC #1), it is assumed that the transmission quality of the PRACH and the PUCCH is prioritized over the PUSCH, and, in the secondary cell (TAG #2 and CC #2), it is assumed that the transmission quality of the PUSCH and the SRS is prioritized over the PUCCH. In this case, the base station apparatus eNB expressly determines the PUSCH of TAG #1 (CC #1) as the target to which apply power scaling is applied, and expressly determines the PUCCH of TAG #2(CC #2) as the target to which power scaling is applied to.

The base station apparatus eNB reports the TAG (or the cell, the CC, the uplink physical channel, etc.) to be the target of power scaling, determined by one of the above-described methods, to the user terminal UE by higher layer signaling. By this means, it is possible to minimize the overhead, which increases by signaling the TAG (or the cell, the CC, the uplink physical channel, etc.), to which power scaling is applied.

The TAG (or the cell, the CC, the uplink physical channel, the packet, etc.) to apply power scaling to is reported from the base station apparatus eNB to the user terminal UE through the downlink. In the state in which MTA is applied to the user terminal, if the total transmission power exceeds the upper limit, the user terminal UE applies power scaling to the TAG (or the cell, the CC, the uplink physical channel, etc.) and reduces the transmission power.

Assume that, in the state the user terminal UE is connected to multiple cells, the TAG to apply power scaling to is reported. In this case, if MTA is applied to the user terminal UE and the total transmission power exceeds the upper limit in a PO period, the transmission power of the CC that is included in the TAG reported in advance is reduced.

Assume that, in the state in which the user terminal UE is connected to the primary cell and the secondary cell, for example, the primary cell (or the secondary cell) is reported as the cell to which power scaling is applied.

In this case, if MTA is applied to the user terminal UE and the total transmission power exceeds the upper limit in a PO period, the transmission power of the primary cell (or the secondary cell) that is reported in advance is reduced.

The user terminal UE may acquire information that links physical channels with cells, in advance, and have the cell where power scaling is applied reported from the base station apparatus eNB. For example, assume that, when the primary cell for control signals (TAG #1 and CC #1) becomes the target of power scaling, the data signal (PUSCH) in the primary cell is determined to be subject to power scaling. When the total transmission power exceeds the upper limit in the PO period, if the primary cell (TAG #1 and CC #1) is reported in advance as the target of power scaling, the user terminal UE reduces the transmission power of the PUSCH of the primary cell. Alternatively, assume that, when the secondary cell for data transmission (TAG #2 and CC #2) becomes the target of power scaling, the control signal (PUCCH) in the secondary cell is determined to be subject to power scaling. When the total transmission power exceeds the upper limit in the PO period, if the secondary cell (TAG #2 and CC #2) is reported in advance as the target of power scaling, the user terminal UE reduces the transmission power of the PUCCH of the secondary cell.

When the base station apparatus eNB expressly determines the PUSCH of TAG #1 (CC #1) as the target to apply power scaling to, and expressly determines the PUCCH of TAG #2 (CC #2) as the target to apply power scaling to, the user terminal UE has information about the targets of power scaling determined in this way reported from the base station apparatus eNB. In this case, when the total transmission power in the PO period exceeds the upper limit, the user terminal UE reduces the transmission power of the physical channels that are reported in advance. For example, if the PUSCH of TAG #1 (CC #1) is determined to be the target to apply power scaling to, the transmission power of the PUSCH of TAG #1 (CC #1) is reduced.

It is possible to combine the above-method of applying power scaling with one of methods A and B, which will be shown below.

The power scaling method A applies power scaling on a per physical channel basis based on the priority of each uplink physical channel (PUSCH/PUCCH/PRACH/SRS). For example, the priorities are determined such that: PRACH>PUCCH>PUSCH>SRS.

The power scaling method B applies power scaling by prioritizing the primary cell over the secondary cell.

Another aspect of the present invention provides a method of maintaining transmission quality by implicitly determining the TAG and/or the like, to which power scaling is applied, without signaling. Specific power signaling methods (1) to (5) will be described below.

(1) The user terminal UE may be configured to apply power scaling to a TAG having large transmission power. By this means, the probability that power scaling is applied to a TAG having low transmission power decreases, and it is possible to prevent the significant quality deterioration due to the severe reduction of power to allocate to the TAG having low transmission power.

Assume a case where, in the state in which the user terminal UE is connected to multiple cells, MTA to provide a plurality of transmission times for a plurality of connecting cells on the uplink is applied to the user terminal UE. TAG configurations (the component carrier numbers, information corresponding to the TAG numbers, and so on) related to the component carriers allocated by the base station apparatus eNB is reported to the user terminal UE.

Figure 5:
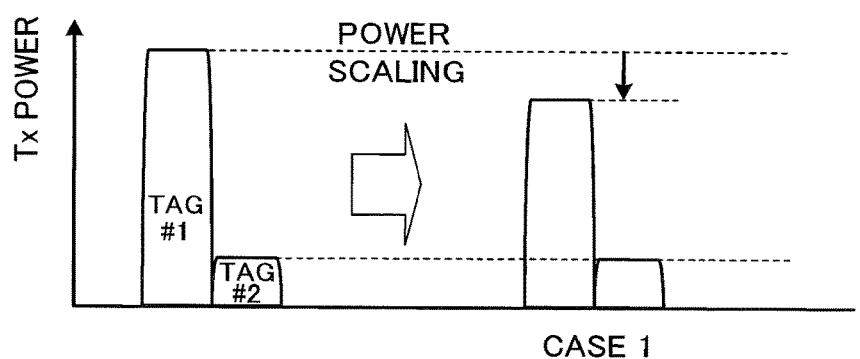
FIG. 5 is a diagram to explain an example of application of power scaling.

As shown in FIG. 5, a plurality of component carriers, allocated to the uplink of the user terminal UE, are classified to TAG #1 and TAG #2. A state is shown here where the transmission power of TAG #1 is greater than the transmission power of TAG #2 in a stage before power scaling is applied.

When the total transmission power on the uplink exceeds the upper limit in the PO period, the user terminal UE applies power scaling to TAG #1 having the greater transmission power. As a result of this, as shown in FIG. 5, the transmission power of TAG #1 decreases, and the total transmission power is reduced to or below the upper limit. At this time, the transmission power of TAG #2, to which power scaling is not applied, is maintained.

(2) The user terminal UE may be configured to apply power scaling to a PUSCH where the transport block size (the number of transmission bits) is small. By this means, the small-sized transport block can prevent quality deterioration by means of power scaling, and reduce the overhead upon retransmissions, unlike large-sized transport blocks that cause quality deterioration.

In LTE, data on an uplink transport channel (for example, the UL-SCH) is incorporated into transport blocks of certain size. In each subframe (transmission time interval: TTI), transport blocks are transmitted on the radio interface between the user terminal UE and the base station apparatus eNB. The transport blocks are divided into codewords and transmitted by physical channels. In the event of one-antenna transmission, one transport block of variable size is transmitted on per TTI. In the event of multiple-antenna transmission, maximum two transport blocks of variable size are transmitted per TTI. The transport block size is defined in the transport format that accompanies the transport blocks. In the transport format, the modulation scheme and antenna mapping are defined, besides the transport block size.

When the user terminal UE is connected to the first cell and the second cell and the total transmission power on the uplink exceeds the upper limit in the PO period, between the transport block allocated to the PUSCH of the first cell and the transport block allocated to the PUSCH of the second cell, the user terminal UE applies power scaling to the PUSCH of the smaller transport block size.

(3) The user terminal UE may be configured to apply power scaling to a TAG where the total allocation bandwidth is small. By this means, it is possible to reduce the frequency bandwidth to consume.

One component carrier or a plurality of component carriers are classified into one TAG, so that there is a possibility that the total allocation bandwidth varies between TAGs. For example, TAG #1 is allocated only one component carrier CC #1, and TAG #2 is allocated two component carriers CC #2 and CC #3.

Assume a case where, in the state in which the user terminal UE is connected to multiple cells, MTA to provide a plurality of transmission times for a plurality of connecting cells on the uplink is applied to the user terminal UE. TAG configurations (the component carrier numbers, information corresponding to the TAG numbers, and so on) related to the component carriers allocated by the base station apparatus eNB is reported to the user terminal UE. When the total transmission power on the uplink exceeds the upper limit in the PO period, the user terminal UE applies power scaling to TAG #1 where the total bandwidth is smaller.

(4) The user terminal UE may be configured to apply power scaling to new uplink packets. By this means, although there is a possibility that, when the transmission power of uplink retransmission packets is reduced, reception errors occur again and the delays accumulate, since the transmission power of new packets is reduced, it is possible to minimize the delay time even if retransmissions occur.

As noted earlier, in each uplink component carrier, uplink channels such as the PUCCH, the PUSCH and so on are placed. The user terminal UE transmits channel state information (CSI) that represents downlink channel states, information that represents ACKs/NACKs (positive acknowledgement/negative acknowledgement) in hybrid ARQ in response to downlink transport blocks, uplink control information (UCI) such as scheduling requests (SRs), to the base station apparatus eNB, by using the PUCCH and/or the PUSCH.

In LTE, retransmissions of damaged/lost data or data that has errors are first processed in MAC layer hybrid ARQ, and, if recovery fails even by this processing, handled in the RLC retransmission protocol. Hybrid ARQ is designed for the purpose of allowing quick retransmissions, so that decoding process results are fed back in response to every transmission. The base station apparatus eNB and the user terminal UE each have a hybrid ARQ entity, and each hybrid ARQ entity is comprised of the hybrid ARQ process. On the receiving side, when a transport block intended for the hybrid ARQ process is received, decoding of the block is tried, and the result—that is, whether or not the block has been received correctly—is reported to the transmitting side by way of an ACK/NACK.

On the uplink, which subframes are retransmitted is always known. In the event of FDD, a retransmission is carried out eight subframes after a data transmission is tried. Whether or not retransmission should be carried out on the uplink is controlled based on new data indicators (NDIs) included in scheduling grants for the uplink transmitted by the PDCCH. The new data indicator
s are configured separately for each transport block to be transmitted. The user terminal UE can decide whether or not to transmit new packets based on the new data indicators included in the PDCCH.

When the user terminal UE is connected with the first cell and the second cell and the total transmission power on the uplink exceeds the upper limit in the PO period, the user terminal UE applies power scaling to new uplink packets and reduces the uplink transmission power.

(5) The user terminal UE may be configured to apply power scaling to retransmission packets. By this means, power scaling is applied to retransmission packet more preferentially than new packets, so that it is possible to reduce the probability of retransmissions of new packets.

(6) It is also possible to combine one of methods (1) to (5) above, with the power scaling methods A and B described earlier. For example, when applying power scaling to TAGs having large transmission power, the user terminal UE may apply power scaling on a per uplink physical channel basis, in the order of priorities of: PRACH>PUCCH>PUSCH>SRS. When applying power scaling to TAGs having large transmission power, the user terminal UE may apply power scaling by prioritizing Pcell over Scell.

Next, examples of the base station apparatus and the user terminal, to which the radio communication method described above is applied, will be described. Although a radio access system designed for LTE and LTE-A will be described as an example, this by no means limits application to other systems.

Figure 6:
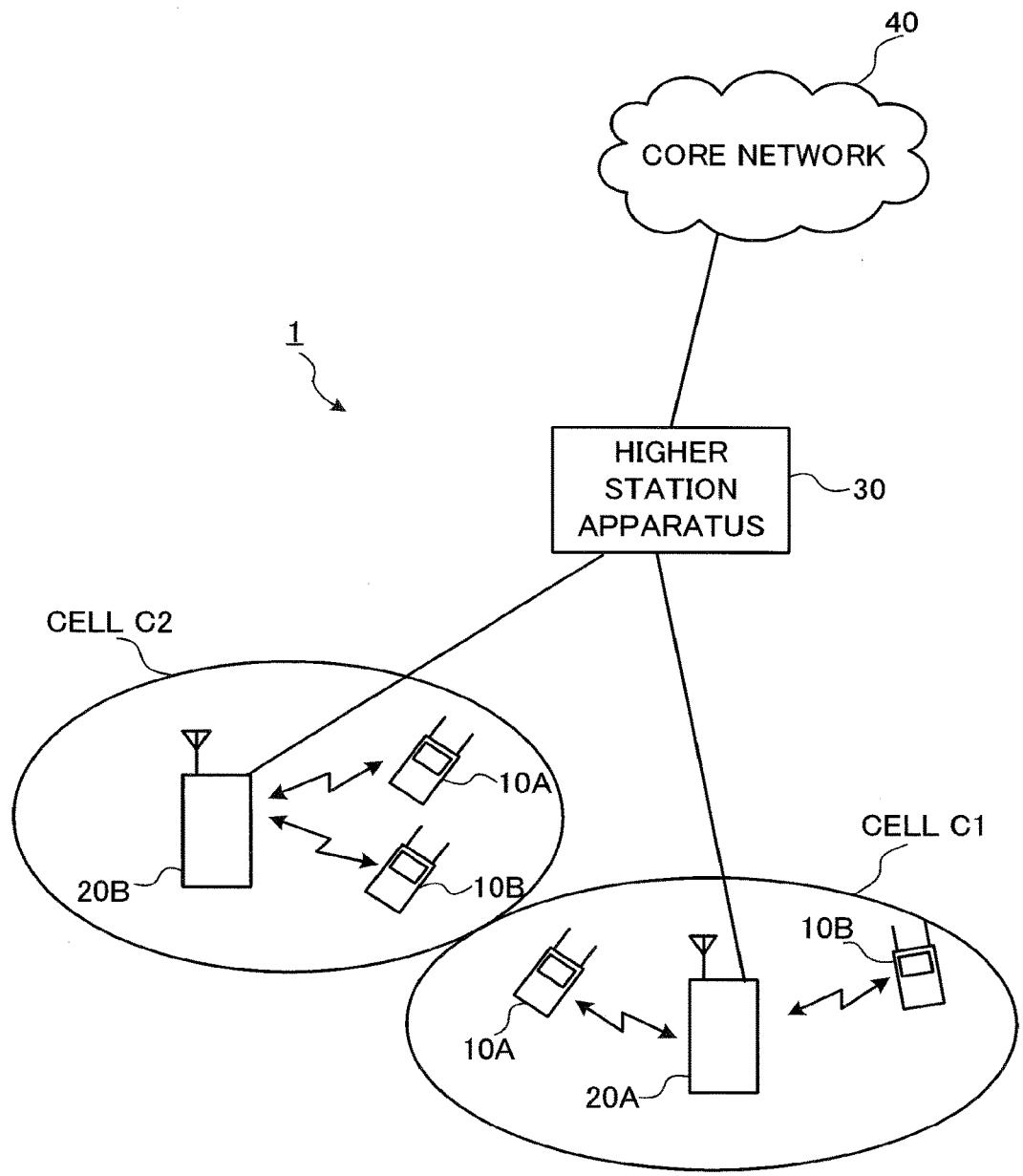
FIG. 6 is a diagram to explain a system structure of a radio communication system according to an embodiment.

FIG. 6 is a network configuration diagram of a mobile communication system where a radio communication method according to an embodiment of the present invention is applied. The radio communication system 1 is configured to include base station apparatuses 20A and 20B, and a plurality of first and second mobile station apparatuses 10A and 10B that communicate with these base station apparatuses 20A and 20B. The base station apparatuses 20A and 20B are connected with a higher station apparatus 30, and this higher station apparatus 30 is connected with a core network 40. The base station apparatuses 20A and 20B are connected with each other by wire connection or by wireless connection. The first and second mobile station apparatuses 10A and 10B can communicate with the base station apparatuses 20A and 20B in cells C1 and C2. The higher station apparatus 30 may be, for example, an access gateway apparatus, a radio network controller (RNC), a mobility management entity (MME) and so on, but is by no means limited to these.

Although the first and second mobile station apparatuses 10A and 10B may be both LTE terminals and LTE-A terminals, the following description will be given simply with respect to the "mobile station apparatus 10," unless specified otherwise. Although, for ease of explanation, the first and second mobile station apparatuses 10A and 10B will be described to perform radio communication with the base station apparatuses 20A and 20B, more generally, it is also possible to use user equipment (UE), which may cover both mobile terminal apparatuses and fixed terminal apparatus.

In the radio communication system 1, as radio access schemes, OFDMA (Orthogonal Frequency Division Multiple Access) is adopted on the downlink, and SC-FDMA (Single-Carrier-Frequency-Division Multiple Access) is adopted on the uplink, but the uplink radio access scheme is not limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Now, communication channels in evolved UTRA and UTRAN will be described. On the downlink, a physical downlink shared channel (PDSCH), which is used by each mobile station apparatus 10 on a shared basis, and a physical downlink control channel, which is a downlink control channel (PDCCH, or also referred to as a "downlink L1/L2 control channel") are used. By the above physical downlink shared channel, user data—that is, normal data signals—is transmitted. Precoding information for uplink MIMO transmission, information about the IDs of users that communicate using the physical downlink shared channel and the users' data transport formats (that is, downlink scheduling information), and information about the IDs of users that communicate using the physical uplink shared channel and information about the users' data transport formats (that is, uplink scheduling grants) and so on are fed back by means of the physical downlink shared channel.

On the downlink, broadcast channels such as the P-BCH (Physical-Broadcast CHannel) and the D-BCH (Dynamic Broadcast CHannel) are transmitted. Information that is transmitted by means of the P-BCH includes MIBs (Master Information Blocks), and information that is transmitted by means of the D-BCH includes SIBs (System Information Blocks). The D-BCH is mapped to the PDSCH, and transmitted from the base station apparatus 20 to the mobile station apparatuses 10.

As for the uplink, a physical uplink shared channel (PUSCH), which is used by each mobile station apparatus 10 on a shared basis, and a physical uplink control channel (PUCCH), which is an uplink control channel, are used. By means of the physical uplink shared channel, user data—that is, normal data signals—is transmitted. By means of the physical uplink control channel, precoding information for downlink MIMO transmission, delivery acknowledgment information for downlink shared channels, downlink radio quality information (CQI) and so on are transmitted.

On the uplink, a physical random access channel (PRACH) for initial access and so on is defined. The mobile terminal apparatus 10 is designed to transmit random access preambles to the base station apparatus 20 in the PRACH.

Figure 7:
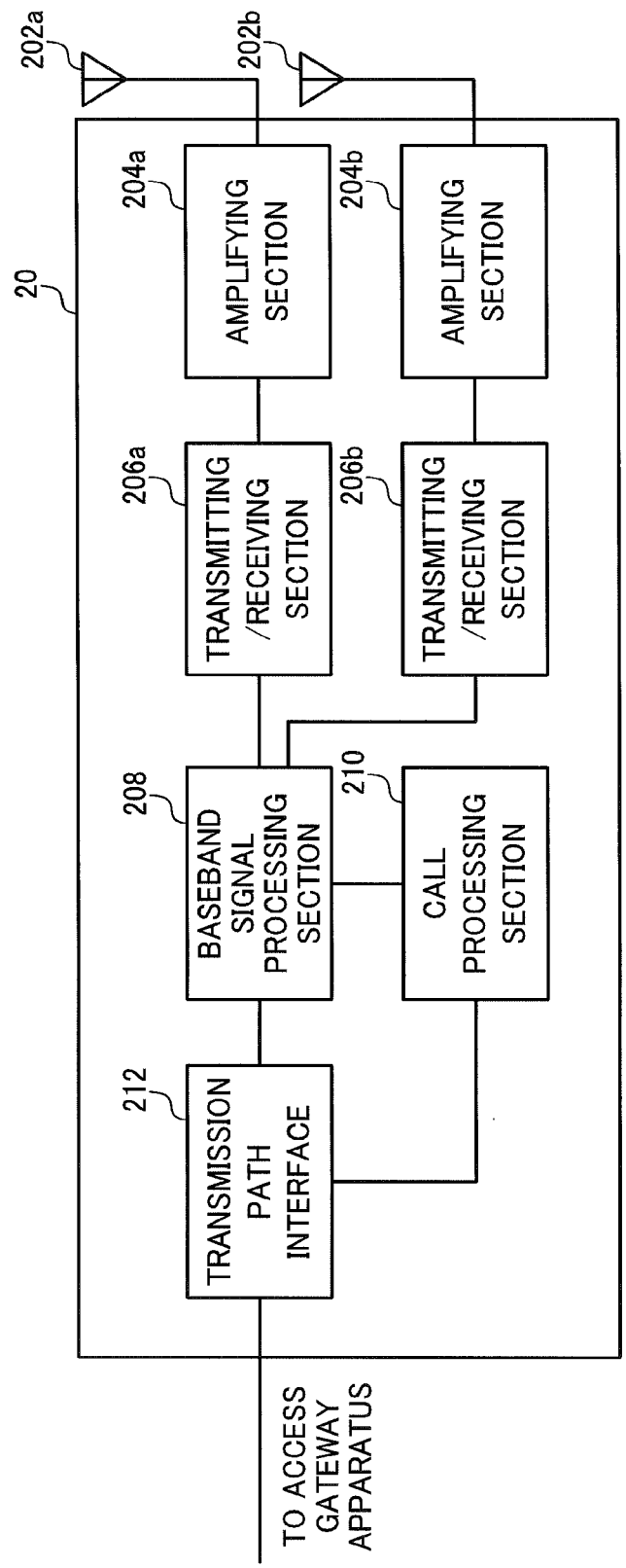
FIG. 7 is a block diagram to show a schematic configuration of a base station apparatus according to an embodiment.

An overall configuration of a base station apparatus according to the present embodiment will be described with reference to FIG. 7. The base station apparatuses 20A and 20B have the same configuration and therefore will be described as the "base station apparatus 20." The first and second mobile station apparatuses 10A and 10B also have the same configuration and therefore will be described as the "mobile station apparatus 10."

The base station apparatus 20 has a plurality of transmitting/receiving antenna 202a, 202b . . . for MIMO transmission, amplifying sections 204a, 204b . . . , transmitting/receiving sections 206a, 206b . . . , a baseband signal processing section 208, a call processing section 210, and a transmission path interface 212. The transmitting/receiving antennas 202a and 202b . . . are, for example, eight antennas, and the amplifying sections 204a, 204b . . . and the transmitting/receiving sections 206a and 206b . . . are provided in numbers to match the number of antennas.

User data that is transmitted from the base station apparatus 20 to the mobile station apparatus 10 on the downlink is input from the higher station apparatus 30 placed above the base station apparatus 20—for example, the access gateway apparatus 30—into the baseband signal processing section 208, via the transmission path interface 212.

The baseband signal processing section 208 performs a PDCP layer process, division and coupling of user data, RLC (Radio Link Control) layer transmission processes such as an RLC retransmission control transmission process, MAC (Medium Access Control) retransmission control, including, for example, an HARQ (Hybrid Automatic Repeat reQuest) transmission process, scheduling, transport format selection, channel coding, an inverse fast Fourier transform (IFFT) process, and a precoding process, and transfers the result to the transmitting/receiving sections 206a and 206b. The signal of the physical downlink control channel is also subjected to transmission processes such as channel coding and an inverse fast Fourier transform, and then transferred to the transmitting/receiving sections 206a and 206b.

The baseband signal processing section 208 feeds back control information for communication in the cell to the mobile station apparatus 10, through the broadcast channels mentioned earlier. The control information for communication in the cell includes, for example, the uplink or downlink system bandwidth, resource block information allocated to the mobile station apparatus 10, root sequence identification information (root sequence index) for generating random access preamble signals in the PRACH and so on.

Baseband signals that are pre-coded and output from the baseband signal processing section 208 on a per antenna basis are subjected to a frequency conversion process and converted into a radio frequency band in the transmitting/receiving sections 206a and 206b, and, after that, amplified in the amplifying sections 204a and 204b and transmitted from the transmitting/receiving antennas 202a and 202b.

As for data to be transmitted from the mobile terminal apparatus 10 to the radio base station apparatus 20 on the uplink, radio frequency signals that are received in the transmitting/receiving antennas 202a and 202b are amplified in the amplifying sections 204a and 204b, converted into baseband signals through frequency conversion in the transmitting/receiving sections 206a and 206b, and input in the baseband signal processing section 208.

The baseband signal processing section 208 applies, to the user data included in the baseband signals received as input, an FFT process, an IDFT process, error correction decoding, a MAC retransmission control receiving process and RLC layer and PDCP layer receiving processes, and transfers the result to the access gateway apparatus 30 via the transmission path interface 212.

The call processing section 210 performs call processing such as setting up and releasing communication channels, manages the state of the base station apparatus 20, and manages the radio resources.

Figure 8:
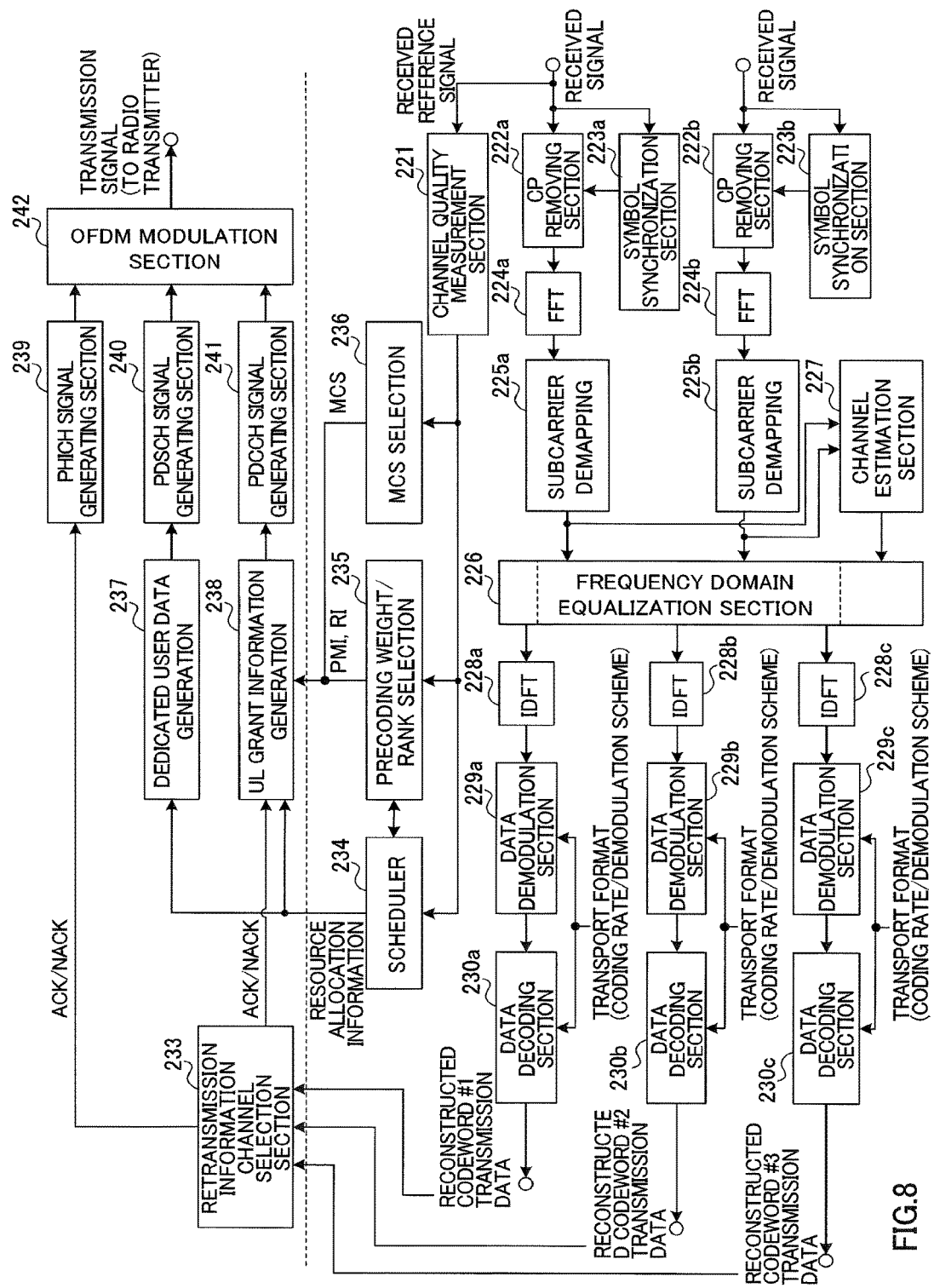
FIG. 8 is a block diagram to show a configuration of a baseband signal processing section in a base station apparatus.

A configuration of the baseband signal processing section 208 of the radio base station apparatus 20 according to the present embodiment will be described with reference to FIG. 8. FIG. 8 is a functional block diagram of the baseband signal processing section 208 in the radio base station apparatus 20 according to the present embodiment. In FIG. 8, configurations such as a scheduler 234 and others are also included for ease of explanation.

Reference signals (quality measurement reference signals) included in received signals are input in a channel quality measurement section 221. The channel quality measurement section 221 measures uplink channel quality information (CQI) based on the received state of the reference signals received from the mobile station apparatus 10. Received signals that are input in the baseband signal processing section 208 have the cyclic prefixes attached to the received signals removed in CP (Cyclic Prefix) removing sections 222a and 222b, and, after that, converted into frequency domain information through a Fourier transform in fast Fourier transform sections 224a and 224b. Symbol synchronization sections 223a and 223b estimate the synchronization time from the reference signals included in the received signals, and report the estimation result to the CP removing sections 222a and 222b.

The received signals, converted into frequency domain information, are demapped in the frequency domain in the subcarrier demapping sections 225a and 225b. The subcarrier demapping sections 225a and 225b perform the demapping in accordance with the mapping in the mobile station apparatus 10. Here, among the received signals received on the uplink, the received signal that is input in the subcarrier demapping section 225b is comprised of two uplink data codewords #2 and #3 combined. The frequency domain equalization section 226 equalizes the received signals based on channel estimation values provided from a channel estimation section 227. The channel estimation section 227 estimates channel states on a per component carrier basis from the reference signals included in the received signals, and the frequency domain equalization section 226 equalizes the received signals (codewords) on a per component carrier basis.

The inverse discrete Fourier transform sections (IDFT) 228a, 228b and 228c apply an inverse discrete Fourier transform to the received signal and converts the frequency domain signals back to time domain signals. The data demodulation sections 229a, 229b and 229c and the data decoding sections 230a, 230b and 230c reconstruct uplink user data based on the transport format of each component carrier (the coding rate, the modulation scheme and so on). By this means, the transmission data of codeword #1 corresponding to the first transport block, the transmission data of codeword #2 corresponding to the second transport block, and the transmission data of codeword #3 corresponding to the third transport block are reconstructed.

The re-constructed transmission data of codewords #1, #2 and #3 is output to a retransmission information channel selection section 233. The retransmission information channel selection section 233 determines whether or not it is necessary to retransmit the transmission data of codewords #1, #2 and #3 (ACK/NACK). Then, based on whether or not it is necessary to retransmit the transmission data of codewords #1, #2 and #3, retransmission-related information such as NDI information and RV information is generated. The retransmission information channel selection section 231 selects the channel (the PHICH or the PDCCH (UL grants)) to transmit the retransmission information.

The scheduler 234 determines uplink and downlink resource allocation information based on channel quality information (CQI) given from the channel quality measurement section 221, and PMI information and RI information given from a precoding weight/rank selection section 235, which will be described later.

The precoding weight/rank selection section 235 determines precoding weights (PMIs) for controlling the phase and/or amplitude of transmission signals on a per antenna basis in the mobile station apparatus 10, from the uplink received quality in the resource blocks allocated to the mobile station apparatus 10, based on the channel quality information (CQI) given from the channel quality measurement section 221. The precoding weight/rank selection section 235 determines the rank (RI), which represents the number of space multiplexing layers in the uplink, based on the channel quality information (CQI) given from the channel quality measurement section 221.

An MCS selection section 236 selects the modulation scheme/channel coding rate (MCS) based on the channel quality information (CQI) given from the channel quality measurement section 221.

A dedicated user data generating section 237 generates dedicated downlink transmission data (dedicated user data) for each mobile station apparatus 10, from user data that is input from the higher station apparatus 30 such as the access gateway apparatus 30, in accordance with resource allocation information given from the scheduler 234.

With the present embodiment, the dedicated user data generating section 237 functions as a control section that expressly indicates the TAG, to which power scaling should be applied, to the mobile station apparatus 10, based on control signals input from the higher station apparatus or information given from the scheduler 234, and signals power scaling target information such as the TAG to apply power scaling to, to the mobile station apparatus 10.

The target to apply power scaling to is not limited to being provided in TAG units, but may also be provided in component carrier units, in uplink physical channel units, or in packet units.

For example, it is possible to use the transmission quality and/or the traffic of the connecting cells where the mobile station apparatus 10 is connected, as a basis for decision making. The dedicated user data generating section 237 may expressly determine the TAG, to which power scaling is applied in the mobile station apparatus 10, by using cell configurations as a basis for decision making. The dedicated user data generating section 237 may expressly determine the uplink physical channels to apply power scaling to, in physical channel units. For example, in the primary cell (TAG #1 and CC #1), the transmission quality of the PRACH and the PUCCH may be prioritized over the PUSCH, and, in the secondary cell (TAG #2 and CC #2), the transmission quality of the PUSCH and the SRS may be prioritized over the PUCCH. In this case, the base station apparatus 20 expressly determines the PUSCH of TAG #1 (CC #1) as the target to apply power scaling to, and expressly determines the PUCCH of TAG #2 (CC #2) as the target to apply power scaling to.

When cell C1 as the first cell is managed for control signals and cell C2 as the second cell is managed for data transmission, and the component carriers included in the first cell C1 are classified as the first timing group and the component carriers included in the second cell C2 are classified as the second timing group, the PUCCH of the first timing group, the PUSCH and/or the SRS of the second timing group are expressly determined as physical channels to which power scaling is applied.

The dedicated user data generating section 237 generates user data for reporting the TAG (or the cell, the CC, the uplink physical channel, the packet, etc.), to which power scaling is applied to, expressly determined by one of the above-described methods, to the mobile station apparatus 10 by higher layer signaling.

The UL grant information generating section 238 generates a DCI format, which includes the above-described UL grant, based on ACK/NACK information and retransmission-related information (NDI information and RV information) given from the retransmission information channel selection section 233, resource allocation information given from the scheduler 234, PMI and RI information given from precoding weight/rank selection section 233, and MCS information given from the MCS selection section 236.

The PHICH signal generating section 239 generates the PHICH signal, which includes a hybrid ARQ acknowledgement response for showing whether or not a transport block needs to be retransmitted to the mobile station apparatus 10, based on the ACK/NACK information and retransmission-related information (NDI information and RV information) given from the retransmission information channel selection section 233.

The PDSCH signal generating section 240 generates the downlink transmission data to actually transmit by the physical downlink shard channel (PDSCH), based on the downlink transmission data (dedicated user data) generated in the dedicated user data generating section 237. The PDCCH signal generating section 241 generates the PDCCH signal to multiplex over the PDCCH based on the DCI format including the UL grant, generated in the UL grant information generating section 238.

The PHICH signal, the PDSCH signal and the PDCCH signal generated in these PHICH signal generating section 239, PDSCH signal generating section 240 and PDCCH signal generating section 241 are input in an OFDM modulation section 242. The OFDM modulation section 242 applies an OFDM modulation process to two sequences of signals including these PHICH signal, PDSCH signal and PDCCH signal, and transmits the results to the transmitting/receiving sections 206a and 206b.

In this way, the base station apparatus 20 expressly indicates the TAG (or the CC, the uplink physical channel, the packet, etc.), to which power scaling is applied, to the mobile station apparatus 10, and signals power scaling target information such as the TAG to apply power scaling to, to the mobile station apparatus 10, by higher layer signaling. By this means, it becomes possible to determine the TAG and/or the like, to which the mobile station apparatus 10 should apply power scaling, in the base station apparatus 20, so that it is possible to improve the flexibility in network management. The base station apparatus 20 can flexibly determine the TAG (or the cell, the CC, the uplink physical channel, the packet, etc.), to which power scaling should be applied, by taking into account the communication environment (the cell configurations, the conditions of carrier aggregation, transmission quality, traffic, transmission power, transport block size, packet type and so on), and reduce the deterioration of uplink transmission quality due to application of power scaling. Since power scaling target information is reported to the mobile station apparatus 10 through higher layer signaling, it is also possible to reduce the overhead.

Figure 9:
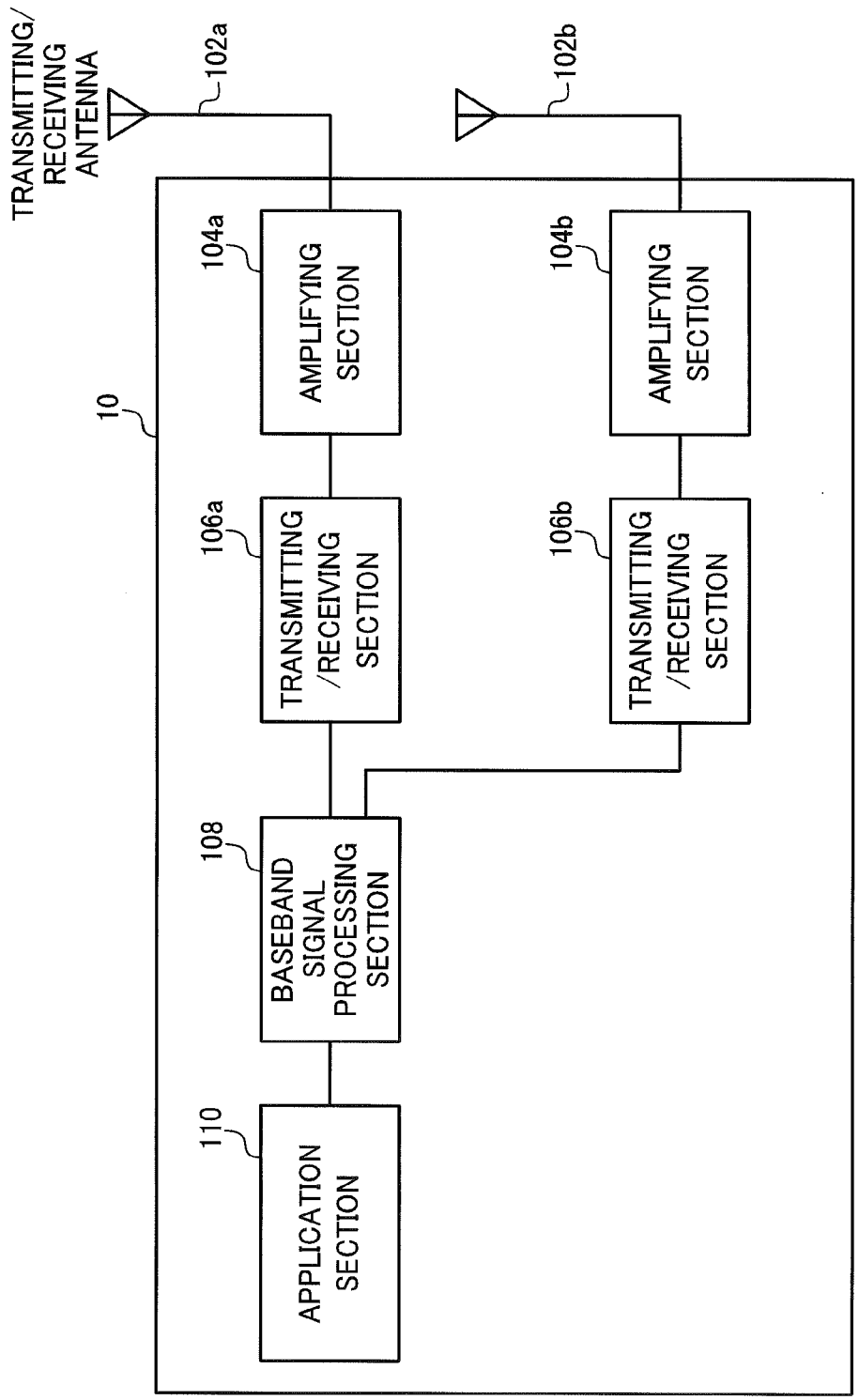
FIG. 9 is a block diagram to show a schematic configuration of a mobile terminal apparatus according to an embodiment.

Next, a configuration of a mobile station apparatus 10 according to the present embodiment will be described with reference to FIG. 9. As shown in FIG. 9, the mobile station apparatus 10 according to the present embodiment has two transmitting/receiving antennas 102a and 102b for MIMO transmission, amplifying sections 104a and 104b, transmitting/receiving sections 106a and 106b, a baseband signal processing section 108, and an application section 110.

As for downlink data, radio frequency signals that are received in the two transmitting/receiving antennas 102a and 102b are amplified in the amplifying sections 104a and 104b, and converted into baseband signals through frequency conversion in the transmitting/receiving sections 106a and 106b. The baseband signals are subjected to an FFT process, error correction decoding, a retransmission control receiving process and so on in the baseband signal processing section 108. In this downlink data, downlink user data is transferred to the application section 110. The application section 110 performs processes related to higher layers above the physical layer and the MAC layer. In the downlink data, broadcast information is also transferred to the application section 110.

Uplink user data is input from the application section 110 to the baseband signal processing section 108. The baseband signal processing section 108 performs a retransmission control (H-ARQ: Hybrid ARQ) transmission process, channel coding, precoding, DFT process, IFFT process and so on, and transfers the result to the transmitting/receiving sections 106a and 106b. The baseband signals output from the baseband signal processing section 108 are subjected to a frequency conversion process and converted into a radio frequency band in the transmitting/receiving sections 106a and 106b, and, after that, amplified in the amplifying sections 104a and 104b and transmitted from the transmitting/receiving antennas 102a and 102b.

Figure 10:
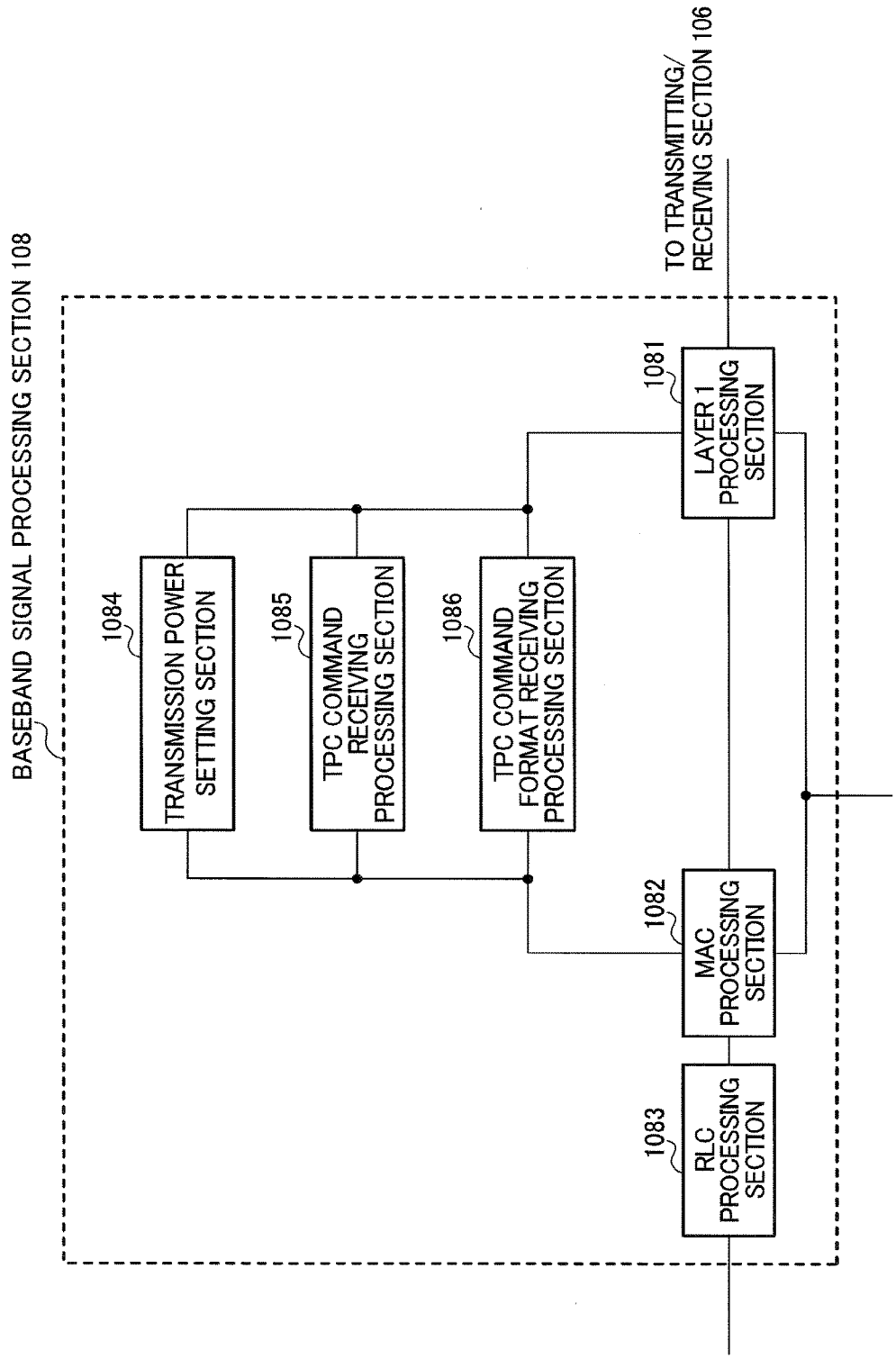
FIG. 10 is a block diagram to show a configuration of a baseband signal processing section in a mobile station apparatus.

FIG. 10 is a block diagram showing a configuration of the baseband signal processing section 108. The baseband signal processing section 108 is primarily formed with a layer 1 processing section 1081, a MAC processing section 1082, an RLC processing section 1083, a transmission power setting section 1084, a TPC command received processing section 1085 and a TPC command format receiving processing section 1086.

The layer 1 processing section 1081 mainly performs processes related to the physical layer. The layer 1 processing section 1081, for example, applies processes such as channel decoding, a discrete Fourier transform, frequency demapping, an inverse Fourier transform and data demodulation to signals received on the downlink. The layer 1 processing section 1081 performs processes for signals to transmit on the downlink, including channel coding, data modulation, frequency mapping and an inverse fast Fourier transform (IFFT).

The MAC processing section 1082 performs, for the signals received on the downlink, MAC layer retransmission control (hybrid ARQ), an analysis of downlink scheduling information (specifying the PDSCH transport format and specifying the PDSCH resource blocks) and so on. The MAC processing section 1082 performs, for the signals to transmit on the uplink, MAC retransmission control, an analysis of uplink scheduling information (specifying the PUSCH transport format and specifying the PUSCH resource blocks and so on) and so on.

The RLC processing section 1043 performs, for packets received on the downlink/packets to transmit on the uplink, packet division, packet combining, RLC layer retransmission control, and so on.

The TPC command receiving process section 1085 receives TPC commands reported from the base station apparatus 20, and detects the contents of the TPC commands. The TPC command receiving process section 1085 detects the contents of the TPC commands based on TPC command formats received in the TPC command format receiving process section 1086. Information about the TPC commands is sent to the transmission power setting section 1084.

The TPC command format receiving process section 1086 receives the signals of TPC command formats reported from the radio base station apparatus. The TPC command format receiving process section 1086 receives a TPC command format signal with an expanded number of bits (for example, three bits) upon uplink MU-MIMO transmission. When uplink MU-MIMO transmission is not carried out, the TPC command format receiving process section 1086 receives the TPC command format signal that is defined in the LTE system. Information about the TPC command formats is sent to the transmission power setting section 1084.

The transmission power setting section 1084 sets transmission power using transmission power control information (TPC command formats and TPC commands). To the mobile station apparatus 10, the TAG (or the cell, the CC, the uplink physical channel, the packet, etc.), to which power scaling is applied, is reported from the base station apparatus 20 on the downlink. If, in the state in which MTA is applied, the total transmission power exceeds the upper limit value defined, the transmission power setting section 1084 applies power scaling to the TAG (the cell, the CC, the uplink physical channel or the packet) that is reported in advance, and reduces the transmission power.

For example, assume that the TAG to apply power scaling to is reported as the target of power scaling in the state in which the mobile station apparatus 10 is connected with multiple cells C1 and C2. In this case, if MTA is applied to the mobile station apparatus 10 and the total transmission power exceeds the upper limit in the PO period (see FIG. 4), the transmission power setting section 1084 reduces the transmission power of the CCs included in the TAG reported in advance.

Assume that, in the state in which the mobile station apparatus 10 is reported to cell C1 that serves as the primary cell and to cell C2 that serves as the secondary cell, for example, the primary cell is reported as the cell to which power scaling is applied. In this case, if MTA is applied to the mobile station apparatus 10 and the total transmission power exceeds the upper limit in the PO period, the transmission power setting section 1084 reduce the transmission power of the primary cell that is reported in advance.

The mobile station apparatus 10 may acquire information that links physical channels with cells, in advance, and have the cell where power scaling is applied reported from the base station apparatus 20. For example, assume that, when the primary cell C1 for control signals (TAG #1 and CC #1) becomes the target of power scaling, the data signal (PUSCH) in the primary cell C1 is determined to be subject to power scaling. When the total transmission power exceeds the upper limit in the PO period, if the primary cell C1 (TAG #1 and CC #1) is reported in advance as the target of power scaling, the mobile station apparatus 10 reduces the transmission power of the PUSCH of the primary cell C1. Alternatively, assume that, when the secondary cell for data transmission (TAG #2 and CC #2) becomes the target of power scaling, the control signal (PUCCH) in the secondary cell is determined to be subject to power scaling. When the total transmission power exceeds the upper limit in the PO period, if the secondary cell (TAG #2 and CC #2) is reported in advance as the target of power scaling, the user terminal UE reduces the transmission power of the PUCCH of the secondary cell.

When the base station apparatus 20 expressly determines the PUSCH of TAG #1 (CC #1) as the target to apply power scaling to, and expressly determines the PUCCH of TAG #2 (CC #2) as the target to apply power scaling to, the mobile station apparatus 10 has information about these targets of power scaling determined in this way reported from the base station apparatus 20. In this case, in the mobile station apparatus 10, when the total transmission power in the PO period exceeds the upper limit, the transmission power setting section 1084 reduces the transmission power of the physical channels that are reported in advance. For example, if the PUSCH of TAG #1 (CC #1) is determined to be the target to apply power scaling to, the transmission power of the PUSCH of TAG #1 (CC #1) is reduced.

Alternatively, by implicitly determining the TAG, to which power scaling is applied, even when the above power scaling methods (1) to (5) to maintain transmission quality are applied, without carrying out signaling, the transmission power setting section 1084 reduces the transmission power of the TAG (the cell, the CC, the uplink physical channel, or the packet) by applying one of the power scaling methods (1) to (5) described above, in the PO period in which the total transmission power exceeds the upper limit.

For example, when power scaling is determined to be applied to a TAG having large transmission power, the transmission power setting section 1084 calculates the sum of transmission power per TAG, and applies power scaling to the TAG of the largest transmission power. At this time, signaling of power scaling target information from the base station apparatus 20 is not necessary.

When power scaling is determined to be applied to the PUSCH of a small transport block size (with a small number of transmission bits), for example, if transport blocks are allocated to cell C1 and cell C2, the transmission power setting section 1084 reduces the transmission power of the cell where the transport block of the larger size is allocated. By this means, it is possible to reduce the overhead upon retransmissions. At this time, signaling of power scaling target information from the base station apparatus 20 is not necessary.

When power scaling is determined to be applied to a TAG where the total allocation bandwidth is small, if CC #1 alone is allocated to cell C1 and CC #2 and CC #3 are allocated to cell C2, the transmission power setting section 1084 applies power scaling to the TAG of cell C1.

When power scaling is determined to be applied to new uplink packets, the transmission power setting section 1084 applies power scaling to new packets in accordance with detection results in the new data transmission/retransmission determining section 115. When power scaling is determined to be applied to retransmission packets, the transmission power setting section 1084 applies power scaling to retransmission packets in accordance with detection results in the new data transmission/retransmission determining section 115. Whether the target packets to apply power scaling to are new packets or retransmission packets on the uplink depends on system management.

Figure 11:
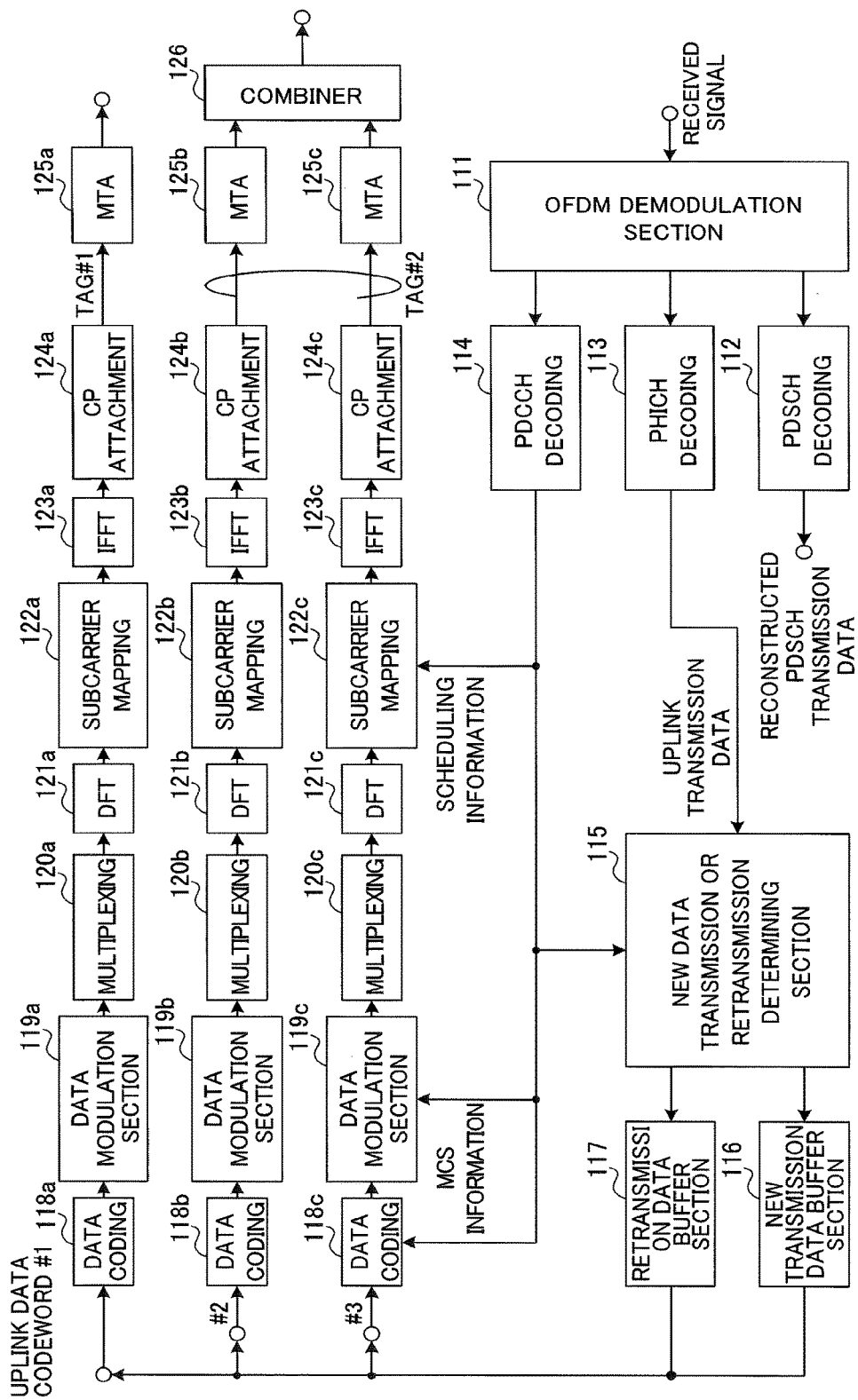
FIG. 11 is a block diagram to show a configuration of a layer 1 processing section in a baseband signal processing section of a mobile station apparatus.

The configuration of the layer 1 processing section 1081 in the baseband signal processing section 108 of the mobile station apparatus 10 will be described with reference to FIG. 11. A shown in this drawing, received signals output from the transmitting/receiving sections 106*a* and 106*b* are demodulated in the OFDM demodulation section 111. Of the downlink received signals demodulated in the OFDM demodulation section 111, the PDSCH signal is input in the downlink PDSCH decoding section 112, the PHICH signal is input in the downlink PHICH decoding section 113, and the PDCCH signal is input in the downlink PDCCH decoding section 114. The downlink PDSCH decoding section 112 decodes the PDSCH signal, and reconstructs the PDSCH transmission data. The downlink PHICH decoding section 113 decodes the downlink PHICH signal. The downlink PDCCH decoding section 114 decodes the PDCCH signal. DCI format to include UL grants is included in the PDCCH signal. When power scaling target information is signaled from the base station apparatus 20 to the mobile station apparatus 10 through higher layer signaling, the power scaling target information is included in the transmission data that is given by decoding the PDSCH signal.

When a hybrid ARQ acknowledgment response (ACK/NACK) is included in the PHICH signal decoded in the downlink PHICH decoding section 113, the new data transmission/retransmission determining section 115 decides between a new data transmission or a retransmission based on this hybrid ARQ acknowledgment response (ACK/NACK). When a hybrid ARQ acknowledgement (ACK/NACK) is included in the UL grant of the PDCCH signal, the new data transmission/retransmission determining section 115 decides between a new data transmission or a retransmission based on this hybrid ARQ acknowledgment response (ACK/NACK). The determined results are reported to a new transmission data buffer section 116 and a retransmission data buffer section 117.

The new transmission data buffer section 116 buffers uplink transmission data input from the application section 110. The retransmission data buffer section 117 buffers transmission data output from the new transmission data buffer section 116. When a determined result to the effect of a new data transmission is reported from the data new transmission/retransmission determining section 115, uplink transmission data is generated from the transmission data in the new transmission data buffer section 116. When a determined result to the effect of a data retransmission is reported from the data new transmission/retransmission determining section 115, uplink transmission data is generated from the transmission data in the retransmission data buffer section 117.

The uplink transmission data that is generated is input in a serial-to-parallel conversion section, which is not illustrated. In this serial-to-parallel conversion section, the uplink transmission data is subjected to serial-to-parallel conversion and converted into a number of codewords to match the uplink rank. The codewords represent the coding unit in channel coding, and the number thereof (the number of codewords) is determined uniquely from the rank and/or the number of transmitting antennas. A case is shown here where the number of codewords is determined to be three. The number of codewords and the number of layers (rank) do not always become equal. Uplink codeword #1 transmission data, uplink codeword #2 transmission data and uplink codeword #3 transmission data are input in the data coding sections 118*a*, 118*b* and 118*c*.

The data coding section 118*a* encodes the uplink codeword #1 transmission data. The uplink codeword #1 transmission data encoded in the data coding section 118*a* is modulated in the data modulation section 119*a*, and multiplexed in the multiplexing section 120*a*, and, after that, time sequence information having been subjected to a discrete Fourier transform in the discrete Fourier transform section (DFT) 121*a* is converted into frequency domain information. The data coding section 118*a* and the data modulation section 119*a* perform the coding and modulation processes of the uplink codeword #1 transmission data based on MCS information from the downlink PDCCH decoding section 114. The subcarrier mapping section 112*a* performs frequency domain mapping based on scheduling information (resource allocation information) from the downlink PDCCH decoding section 114. In the data coding sections 118*b* and 118*c* to the subcarrier mapping sections 122*b* and 122*c*, the same processes are applied to uplink codewords #2 and #3 as those applied to uplink codeword #1. Then, with the uplink codeword #1 transmission data after the mapping, the transmission signals are subjected to an inverse fast Fourier transform in the inverse fast Fourier transform sections (IFFT) 123*a*, 123*b* and 123*c*, and converted from frequency domain signals to time domain signals. Then, in cyclic prefix (CP) attaching sections 124*a*, 124*b* and 124*c*, cyclic prefixes are attached to the transmission signals. Here, the cyclic prefixes function as guard intervals for canceling multipath propagation delays and differences in the times of reception between a plurality of users in the base station apparatus 20.

Assume that CC #1 is allocated to cell C1, two CC #2 and CC #3 are allocated to cell C2, CC #1 is classified as TAG #1, and CC #2 and CC #3 are classified as TAG #2. Assume that MTA is applied to the mobile station apparatus 10 that is connected to cell C1 and cell C2, TAG #1 is set at transmission time T1, and TAG #2 is set at transmission time T2. With the present embodiment, uplink data (codeword #1) is transmitted on the uplink of cell C1, and uplink data (codewords #2 and #3) is transmitted on the uplink of cell C2.

Under the above circumstances, for the transmission signal (codeword #1) of the uplink data of cell C1, the transmission time is controlled to time T1 in the MTA processing section 125*a*. For the transmission signal (codeword #2) of the uplink data of cell C2, the transmission time is controlled to time T2 in the MTA processing section 125*b*, and, for the transmission signal (codeword #3), the transmission time is controlled to time T2 in the MTA processing section 125c. The transmission signal (codeword #2) and the transmission signal (codeword #3), which are the uplink data of cell C2, are both controlled to time T2, and furthermore combined in a combiner 126.

In this way, the TAG and/or the like, to which the mobile station apparatus 10 should apply power scaling, are expressly determined in the base station apparatus 20 and signaled, so that the mobile station apparatus 10 is able to apply power scaling to the power scaling target that is reported. As a result of this, it is possible to apply power scaling to the power scaling target, which the base station apparatus 20 determines taking into account the communication environment (cell configurations, the conditions of carrier aggregation, transmission quality, traffic, transmission power, transport block size, packet type and so on), so that it is possible to reduce the deterioration of uplink transmission quality due to application of power scaling.

Although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

What is claimed is:

1. A user terminal that communicates with a radio base station, comprising:
   a transmission section that transmits channels using a first cell and a second cell that are different cells in which the user terminal applies Multiple Timing Advance (MTA); and
   a control section that, when a parameter for a plurality of power control modes on the first and second cells is received from the radio base station by higher layer signaling and when channel transmission of a physical channel to be transmitted in the first cell overlaps at least partially in time with channel transmission of the physical channel to be transmitted in the second cell, preferentially allocates transmission power to one of the channel transmission in the first cell and the channel transmission in the second cell over the other.

2. The user terminal according to claim 1, wherein the first cell is a PCell.

3. The user terminal according to claim 2, wherein the control section controls the transmission section to prioritize PUCCH transmission in the PCell.

4. The user terminal according to claim 1, wherein the physical channel is PUCCH.

5. The user terminal according to claim 1, wherein the physical channel is PUSCH.

6. A radio communication method in a user terminal that communicates with a radio base station, comprising:
   transmitting channels using a first cell and a second cell that are different cells in which the user terminal applies Multiple Timing Advance (MTA); and
   when a parameter for a plurality of power control modes on the first and second cells is received from the radio base station by higher layer signaling and when channel transmission of a physical channel to be transmitted in the first cell overlaps at least partially in time with channel transmission of the physical channel to be transmitted in the second cell, preferentially allocates transmission power to one of the channel transmission in the first cell and the channel transmission in the second cell over the other in the transmitting.

* * * * *